June 27, 1933.  S. A. JULIEN  1,916,110
EYEGLASS REFLECTOR
Filed Nov. 9, 1931
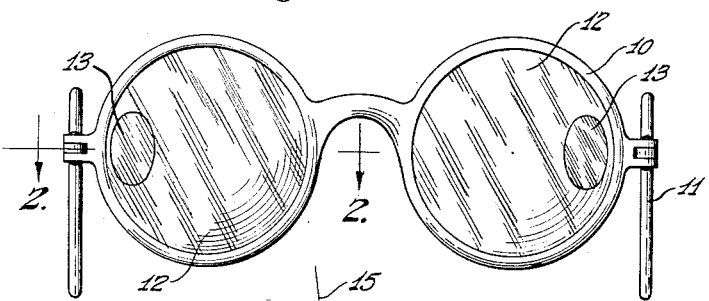
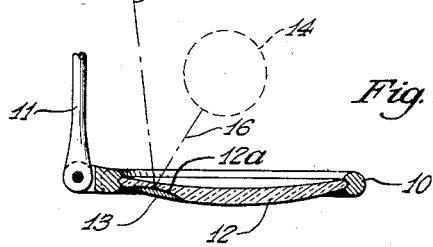
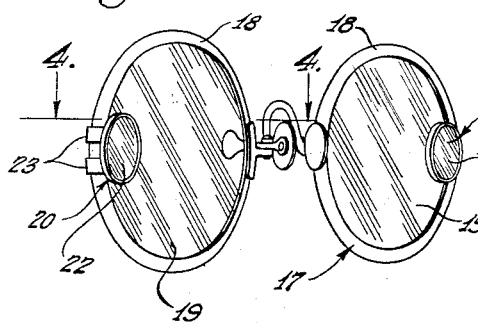
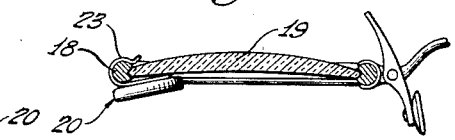
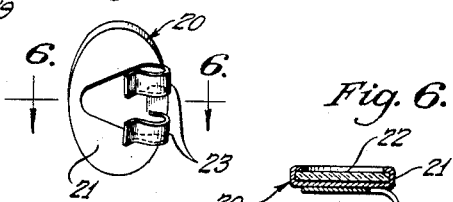
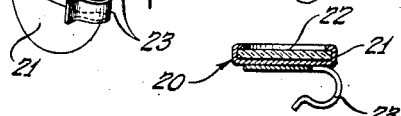
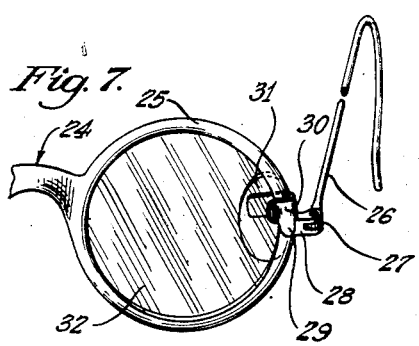
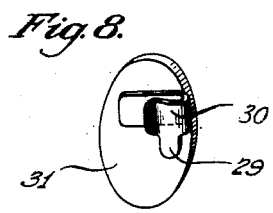
Sven Alfred Julien.
INVENTOR
BY Victor J. Evans & Co.
ATTORNEY Patented June 27, 1933

1,916,110

UNITED STATES PATENT OFFICE

SVEN ALFRED JULIEN, OF CHICAGO, ILLINOIS

EYEGLASS REFLECTOR

Application filed November 9, 1931. Serial No. 574,017.

This invention relates to certain novel improvements in eyeglass reflectors, and has for its principal object the provision of an improved construction of this character which will be highly efficient in use and economical in manufacture.

It is an object of this invention to provide a novel arrangement of reflecting mirrors on eyeglasses so that the wearer thereof may readily have rear vision.

Another object of the invention is to construct and mount the mirrors on the eyeglasses in such a manner that they will effectively afford rear vision to the wearer without interfering with the normal front vision of the wearer.

A further object of the invention resides in providing novel and efficient means for removably clamping the mirrors onto the lens rims of eyeglasses.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a front elevational view of a conventional pair of eyeglasses illustrating one form of the invention attached thereto;

Fig. 2 is a sectional view on line 2—2 in Fig. 1;

Fig. 3 is a perspective view illustrating a modification of the invention;

Fig. 4 is a sectional view on line 4—4 in Fig. 3;

Fig. 5 is a perspective view of one of the mirrors shown in Figs. 3 and 4;

Fig. 6 is a sectional view on line 6—6 in Fig. 5;

Fig. 7 is a perspective view illustrating another modification of the invention; and Fig. 8 is a perspective view illustrating the modification shown in Fig. 7 detached from the eyeglass.

Referring to Figs. 1 and 2 of the drawing which illustrate a preferred and practical embodiment of the invention, 10 indicates generally a conventional eyeglass frame having bows 11 attached thereto, and 12 indicates the lenses carried by the frame. In this form of the invention I provide on the front side of each lens 12 a concavity 12a in which is a reflecting body 13 which may be provided on the lens in any suitable manner such, for example, as by precipitation from a silver salt solution. The eye of the wearer is indicated at 14 and in use the image of objects to the rear will follow the line of incidence 15, pass through the lens 12, and be reflected by the body 13 back through the lens 13 and along the line of reflection 16 to the eye 14 whereby the wearer may see objects to the rear without turning his head and with no interference to front vision through the lenses 12 since the reflecting bodies 13 are arranged at the side of the line of vision through the lenses 12.

In the form of the invention shown in Figs. 3, 4, 5 and 6, conventional eyeglass frame of the pince-nez type is indicated generally at 17 and includes lens rims 18 enclosing lenses 19. On the front side of each of the lenses 19 I arrange a reflecting mirror indicated generally at 20 and including a frame 21 which houses the reflecting element 22. On each of the frames 21 I mount a pair of spring clasps 23, by soldering or in any other suitable manner, and these clasps grip the rims 18 so as to removably support the reflectors on the rims whereby the reflectors 22 will function in the manner hereinbefore described for the reflecting bodies 13.

In the modification illustrated in Figs. 7 and 8, a conventional eyeglass frame is indicated at 24 and includes a lens rim 25 and bow 26 having a hinge connection 27 with the rim 25 which carries a typical lens 32. This hinge structure includes a boss 28 which projects from the rim 25.

Indicated at 32 is a mirror to the rear side of which is attached, in any suitable manner, a clasp 30 which has a depending lip 29 whereby the clasp 30 may be releasably clamped on the rim 25 to mount the mirror 31 on the front side of the lens 32. When the clasp 30 is mounted on the rim 25 the lip 29 abuts the boss 28 and prevents the mirror 31 from being dislodged from the rim 25 since it is evident that the engagement of lip 29 with the boss 28 prevents the possibility of a pulling force exerted on the mirror 31 straightening out the bend or loop in the clasp 30 and dislodging the mirror 31 from the rim 25.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

A rear vision device for a light-penetrable body adapted to be worn on the person before the eye, comprising the combination of a light-penetrable lens having a concavity formed therein on its front side out of the line of front vision, and a light-reflective body secured to said lens in said concavity.

In testimony whereof I affix my signature.

SVEN ALFRED JULIEN.